(12) United States Patent  
Boddy

(10) Patent No.: US 6,598,983 B1
(45) Date of Patent: Jul. 29, 2003

(54) VEHICLE MIRROR ASSEMBLY

(75) Inventor: Ian Boddy, Ada, MI (US)

(73) Assignee: Magna Mirror Systems Inc., Alto, MI (US)

( * ) Notice: Subject to any disclaimer, the term of this patent is extended or adjusted under 35 U.S.C. 154(b) by 0 days.

(21) Appl. No.: 09/179,315

(22) Filed: Oct. 27, 1998

(51) Int. Cl.$^7$ .......................... G02B 5/08; G02B 7/182; B60R 1/06
(52) U.S. Cl. ..................... 359/841; 359/872; 359/881; 248/477; 248/480
(58) Field of Search .................... 359/841, 872, 359/881; 248/477, 479, 480, 549, 900

(56) References Cited

U.S. PATENT DOCUMENTS

| | | | |
|---|---|---|---|
| 1,622,486 A | * | 3/1927 | Bourdon |
| 2,047,325 A | | 7/1936 | Jones |
| 2,393,056 A | * | 1/1946 | Noblitt et al. |
| 2,526,306 A | | 10/1950 | Gelder |
| 2,565,012 A | * | 8/1951 | Barrett |
| 2,596,632 A | * | 5/1952 | Whitehead |
| 2,648,256 A | * | 8/1953 | Budreck |
| 2,827,255 A | * | 3/1958 | Kampa |
| 2,915,944 A | * | 12/1959 | Butts |
| 3,482,811 A | | 12/1969 | Zent |
| 3,671,005 A | | 6/1972 | Schultz |
| 3,954,328 A | | 5/1976 | Ames |
| 3,977,774 A | | 8/1976 | O'Sullivan |
| 4,166,651 A | | 9/1979 | Vandenbrink et al. |
| 4,558,930 A | | 12/1985 | Deedreek |
| 4,711,538 A | * | 12/1987 | Ohs et al. |
| 4,998,812 A | | 3/1991 | Hou |
| 5,039,055 A | | 8/1991 | Lempelius |
| 5,227,924 A | | 7/1993 | Kerper |
| 5,483,385 A | | 1/1996 | Boddy |
| 5,489,080 A | * | 2/1996 | Allen .......................... 248/480 |
| 5,513,048 A | | 4/1996 | Chen |
| 5,572,376 A | | 11/1996 | Pace |
| 5,841,594 A | * | 11/1998 | Rothe .......................... 359/841 |
| 5,903,402 A | * | 5/1999 | Hoek .......................... 359/881 |
| 5,969,890 A | * | 10/1999 | Whitehead .................... 359/841 |

FOREIGN PATENT DOCUMENTS

| | | |
|---|---|---|
| DE | 3501157 C1 | 6/1986 |
| GB | 708349 | 5/1954 |
| GB | 1373052 | 11/1974 |
| GB | 1590740 | 6/1981 |
| GB | 2193940 | 2/1988 |

* cited by examiner

Primary Examiner—Ricky D. Shafer
(74) Attorney, Agent, or Firm—Clark Hill PLC

(57) ABSTRACT

A rearview mirror assembly includes a support structure fixedly mounted to the exterior side of the motor vehicle. A mounting structure comprising a generally U-shaped member having a bight portion and a pair of leg portions defining spaced apart and parallel tubular members is mounted to the support structure for angular movement about a generally vertically extending axis with respect to the vehicle. A mirror housing is slidably mounted to the mounting structure and includes a pair of openings for slidably receiving the tubular members therein. A mirror is mounted to the mirror housing. A clamp is secured to the mirror housing and has a removable clamp-associated insert providing a mounting structure engaging surface for engaging the mounting structure in tightly fit relation so that the mirror housing can be manually repositioned in a lateral direction towards or away from the vehicle through an infinite range of positions.

19 Claims, 5 Drawing Sheets

VEHICLE MIRROR ASSEMBLY

The present invention relates to rearview mirrors for vehicles and, more particularly, to rearview mirrors which are mounted to the side of the truck.

Vehicles, such as trailer trucks, pick-up trucks, and sport utility vehicles, are known to be provided with adjustable rearview mirrors mounted on both sides of the vehicle exterior. The mirrors are positioned forwardly of the driver to allow the driver to view the areas on the sides of the truck rearwardly of the mirrors. It is oftentimes desirable to adjust the position of the mirrors in order to accommodate different fields of view dependent on the length of the trailer being pulled or the height and positioning of individual drivers. The mirror may be adjusted by changing its angular position or by moving it laterally towards or away from the truck body.

Commonly owned U.S. Pat. No. 5,483,385 discloses a side-mounted truck mirror which can be adjusted laterally towards and away from the truck body. The mirror of the '385 patent has a U-shaped member with the bight portion thereof pivotally mounted to the truck exterior and a pair of legs extending outwardly away from the truck exterior. A movable mirror housing has a pair of receiving portions for receiving the legs of the U-shaped member. The U-shaped member legs each have a pair of opposed openings and a resilient engagement element is mounted within each leg with prongs extending outwardly from the respective opposed openings. A pair of clamp members are mounted within the mirror housing and have a series of openings. When the mirror housing is mounted on these legs, the prongs of the engaging elements are biased into engagement with openings on each clamp member corresponding to the desired mirror position. To adjust the mirror position, the mirror housing can be manually engaged and slid along the legs such that the engaging element prongs index along the series of openings.

It can be appreciated that the type of mirror disclosed in the '385 patent, while useful, limits the mirror adjustability to the positions defined by the openings on the clamp members. To obtain optimal viewing of certain fields of it necessary to both pivotally adjust and laterally adjust the mirror position with this type of arrangement. Also, truck vibrations may result in vibratory movement of the mirror as a result of any spacing permitted between the prongs and opening on the clamp member. Such vibratory movement can result in a distorted view of the objects reflected by the mirror.

A number of patents disclose mirror assemblies in which the lateral movement is not indexed or otherwise limited to a set number of positions. However, the lateral adjusting movements in these mirror assemblies can only be affected by manually releasing a locking device and then manually re-locking the device after adjusting the mirror. For example, U.S. Pat. No. 5,039,055 discloses a mirror assembly in which the mirror housing is slidably mounted on a tubular arm. A set screw engages the arm and locks the mirror housing in place. To adjust the mirror position, the set screw must be unscrewed and then re-screwed manually. The problem with this type of arrangement is that if the driver neglects to re-screw the set screw, the mirror may vibrate and distort rearward vision as a result of vehicle vibrations or move out of its position. Other patents disclosing related constructions are: U.K. Patent Application No. 2,193,940A, U.K. Patent Specification No. 1,373,052, U.S. Pat. No. 2,047,325, U.S. Pat. No. 3,482,811, and U.S. Pat. No. 2,526,306.

Another type of laterally adjustable mirror assembly is disclosed in U.S. Pat. No. 5,227,924. The mirror assembly has a mirror housing mounted on a support arm for lateral adjusting movement towards and away from the vehicle. However, to initiate such movement the driver must rotate the mirror housing approximately 180° to a forwardly facing position. In the forwardly facing position, the mirror housing can then be moved laterally and locked in a desired position by rotating the mirror housing back to its normal, rearwardly facing position. This type of arrangement is undesirable because it is not intuitive to the driver that such rotation must be made before adjusting the mirror. Also, this arrangement can be rather inconvenient for a driver experimenting to find an appropriate mirror position because of the repeated rotating associated with repeated adjusting movements.

It is therefore an object of the present invention to provide a truck mirror which is easily repositionable in the lateral direction of the truck body with an improved range of adjustability and configured to provide a clear rearview free from vibratory distortions. In order to achieve this object, the present invention provides a rearview mirror assembly for installation on the side of a motor vehicle. The assembly comprises a fixed support structure constructed and arranged to be mounted to the side of the motor vehicle exterior such that the assembly extends laterally outwardly with respect to the vehicle. A mirror housing mounting structure is mounted to the support structure for angular movement about a generally vertically extending axis with respect to the vehicle. A movable mirror housing is slidably mounted to the mounting structure. The housing has a mounting structure engaging surface engaging the mounting structure in tightly fit relation to limit relative vibratory movements between the mirror housing and the mounting structure as a result of vehicle vibrations. A mirror is mounted to the mirror housing. The mirror is positioned and configured to reflect images of objects disposed rearwardly of the mirror assembly to a driver seated within the motor vehicle. The tightly fit relation between the mounting structure engaging surfaces and the mounting structure is such that (1) the mirror housing can be repositioned laterally towards or away from the vehicle through an infinite range of positions while the mirror faces rearwardly with respect to the vehicle by manually applying lateral force to the housing directed towards or away from the vehicle sufficient to overcome the tightly fit relation without performing additional manual releasing operations and (2) the mirror housing will remain in a selected one of the positions absent application of lateral force to the mirror housing directed towards or away from the vehicle sufficient to overcome the tightly fit relation without performing additional manual securing operations.

Another aspect of the present invention relates to the angular movement of the mirror. It is often desirable to mount a mirror assembly in such a way that it yields and moves when an impact force is applied. By way of example, if the truck is driven too closely to a stationary object, the mirror will contact the object and yieldingly pivot towards the truck as a result of such impact. Such an arrangement is highly desirable because without such yielding, the mirror assembly may otherwise be broken off the truck body. The mirror assembly of the aforementioned '385 patent has the bight portion of the U-shaped member engaged in a tight relation so as to prevent pivotal movement during operation of the truck and allow pivotal movement in the event of an impact force being applied. After such impact-initiated pivotal movement, however, the driver has to manually reposition the mirror assembly and such repositioning usually requires a number of adjusting movements before the assembly is in a satisfactory position. Thus, there exists a need for a mirror assembly which can be easily returned back to its original position after such impact-initiated pivotal movement without repeated repositioning.

U.S. Pat. No. 4,854,539 discloses a mirror assembly which can be returned back to its original position after impact-initiated pivotal movement. The assembly of the '539 patent utilizes a plurality of rollers which engage openings in a detent carrier plate to maintain the mirror in a fixed angular position. The rollers are biased in an axial direction with respect to the pivot axis by a spring aligned coaxially with the pivot axis. The detent carrier plate has a plurality of detents which engage corresponding detents on the mirror support arm. U.S. Pat. 5,678,845 also discloses an axially biased arrangement using a plurality of rotating cams. These arrangements are rather complex and there exists a need for a simpler arrangment for affecting such a function.

It is therefore an object of the present invention to provide a mirror assembly which can be easily repositioned to its original position and utilizes a simpler arrangement than those using axially-biased engaging structures. In order to achieve this objective, there is provided a rearview mirror assembly for installation on the side of a motor vehicle. The assembly comprises a fixed support structure constructed and arranged to be mounted to the side of the motor vehicle exterior such that the assembly extends laterally outwardly with respect to the vehicle. A mirror housing mounting structure is mounted to the support structure for angular movement about a generally vertically extending axis with respect to the vehicle. A mirror housing is mounted to the mounting structure and a mirror is mounted to the mirror housing to reflect images of objects disposed rearwardly of the mirror assembly to a driver seated within the motor vehicle. The support structure has a resiliently yieldingly deformable mounting structure engaging structure and the mounting structure has an engageable portion facing generally radially with respect to the axis. The deformable engaging structure is constructed and arranged to engage the engageable portion in a cooperating relationship so as to yieldingly maintain the mirror mounting structure and the mirror housing in a fixed angular position with respect to the axis. The deformable engaging structure being constructed and arranged such that application of a sufficient impact force to the mirror housing pivots the mounting structure relative to the support structure so as to yieldingly deform the engaging structure in a generally radial direction with respect to the axis and disengage the engageable portion and the engaging structure from one another to thereby allow the mirror housing to move pivotally in the direction of the impact force. The deformable engaging structure is configured such that the mirror housing can thereafter be returned to the fixed angular position by pivotally moving the mirror housing opposite the direction of the impact force until the engaging structure and the engageable portion are aligned and the deformable engaging structure resiliently returns in a generally radial direction with respect to the axis to the engaged cooperating relationship.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
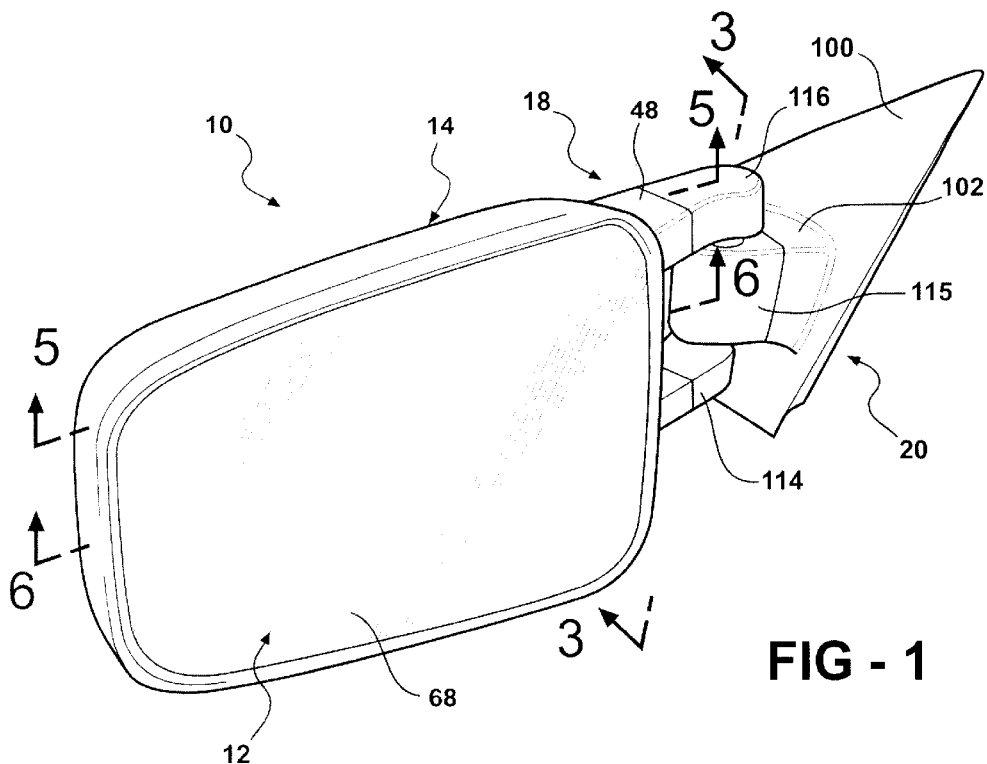
FIG. 1 is a perspective view of a truck mirror assembly embodying the principles of the present invention.
Figure 3:
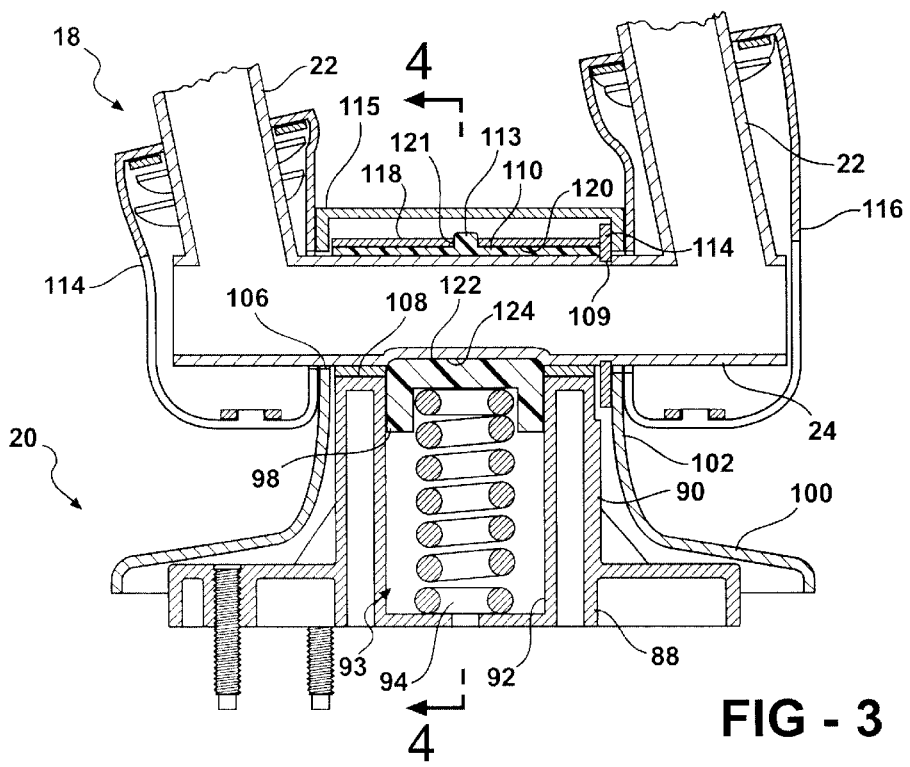
FIG. 3 is an enlarged fragmentary sectional view taken along line 3—3 of FIG. 1.

FIG. 1 shows a truck mirror assembly, generally indicated at 10, constructed in accordance with the principles of the present invention. The assembly 10 comprises a mirror unit, generally indicated at 12, and a mirror housing, generally indicated at 14. The mirror housing 14 is preferably made from ASA material and is in the form of a shell-like casing with an opening for receiving the mirror unit 12.

The mirror assembly 10 also includes a mirror mounting structure, generally indicated at 18, and a fixed support structure, generally indicated at 20. The mirror mounting structure 18 preferably a U-shaped member as shown made of polished stainless steel or aluminum. The mounting structure 18 has a pair of generally parallel legs 22 and an integrally formed bight portion defining a generally cylindrical portion 24. The mounting structure 18 is mounted to the support structure 20 for movement about a generally vertically extending axis coaxial with the cylindrical portion 24. As can be appreciated from the Figures, the cylindrical portion 24 is angled with respect to the legs 22. This angled relationship allows the assembly 10 to be mounted on a truck having an angled body exterior with the mirror housing 14 extending generally parallel to the ground.

Figure 2:
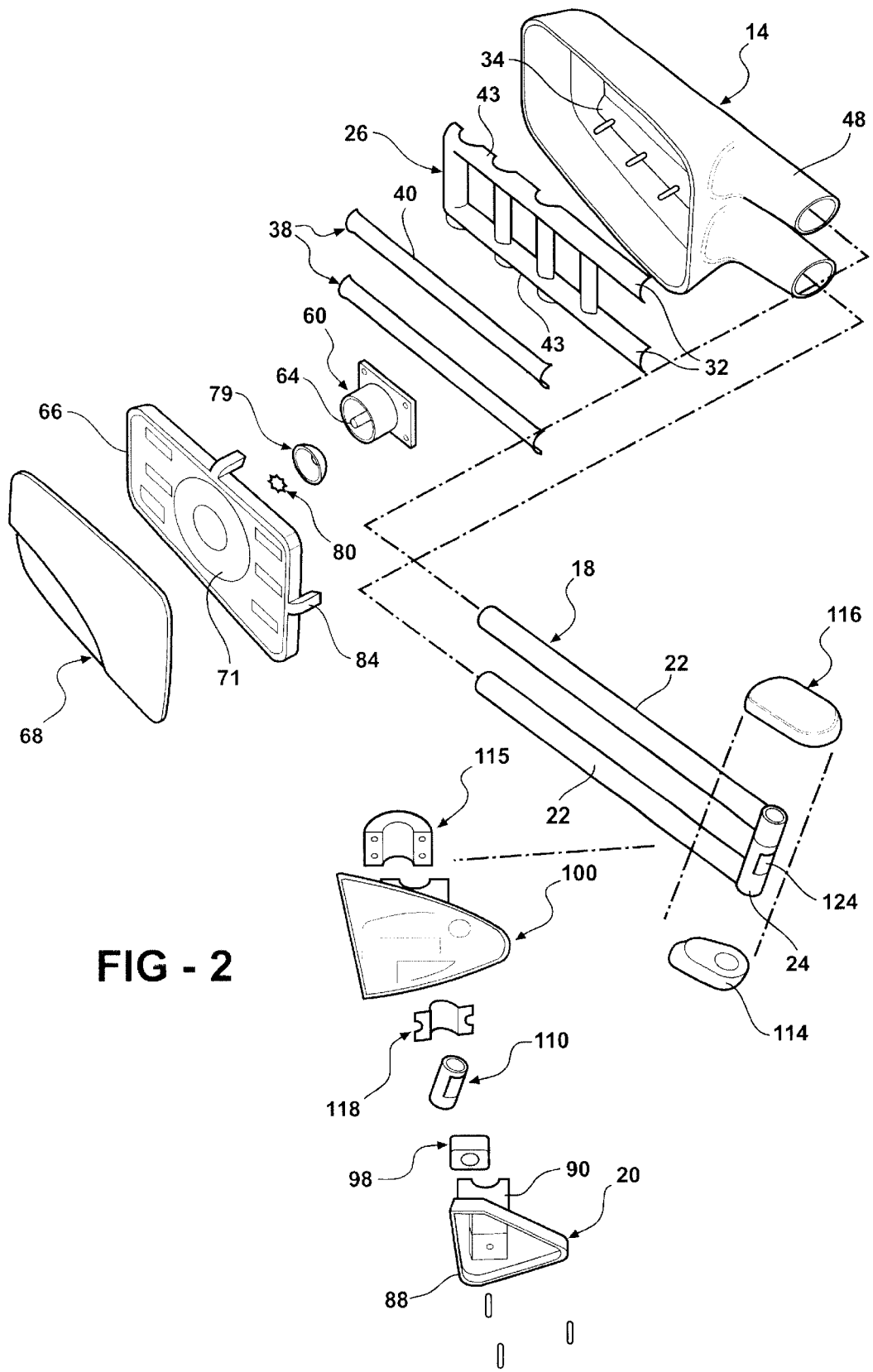
FIG. 2 is an exploded view of the truck mirror assembly of FIG. 1.
Figure 4:
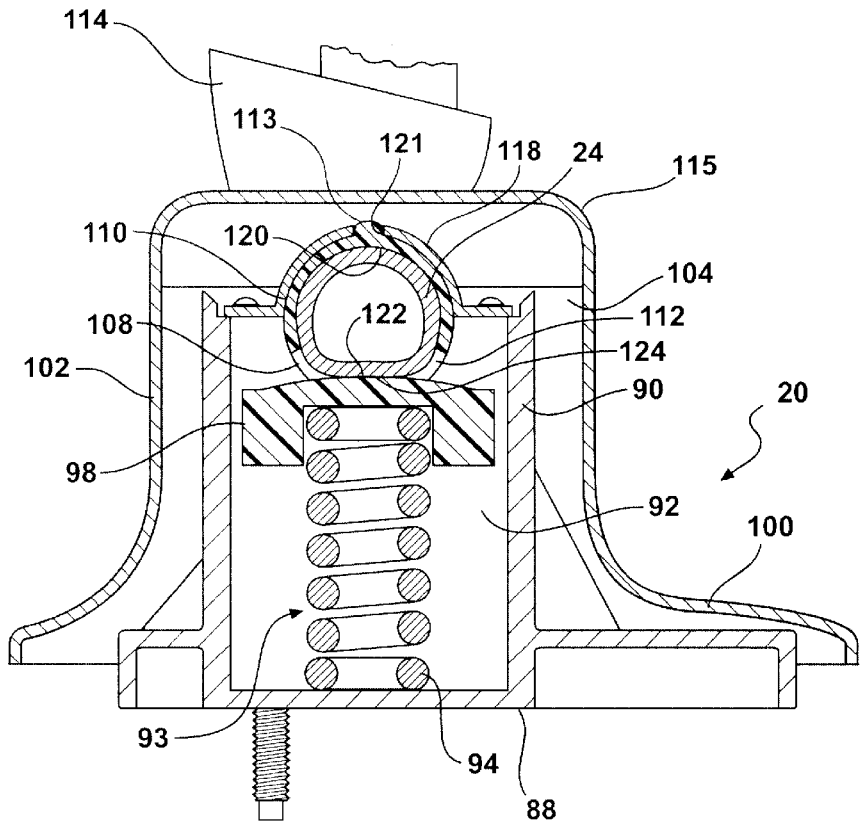
FIG. 4 is an enlarged fragmentary sectional view taken along line 4—4 of FIG. 3.
Figure 7:
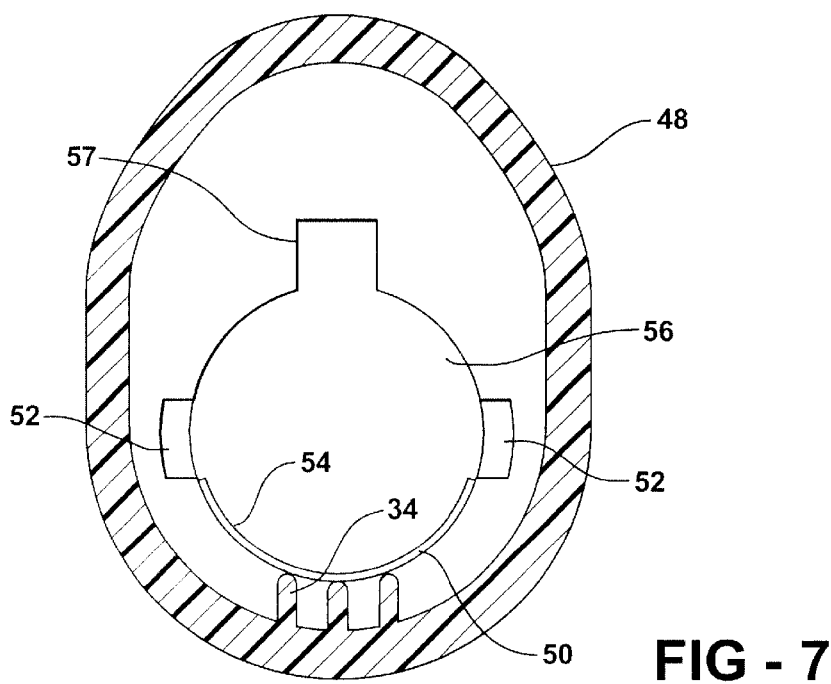
FIG. 7 is an enlarged fragmentary sectional view taken along line 7—7 of FIG. 5.
Figure 6:
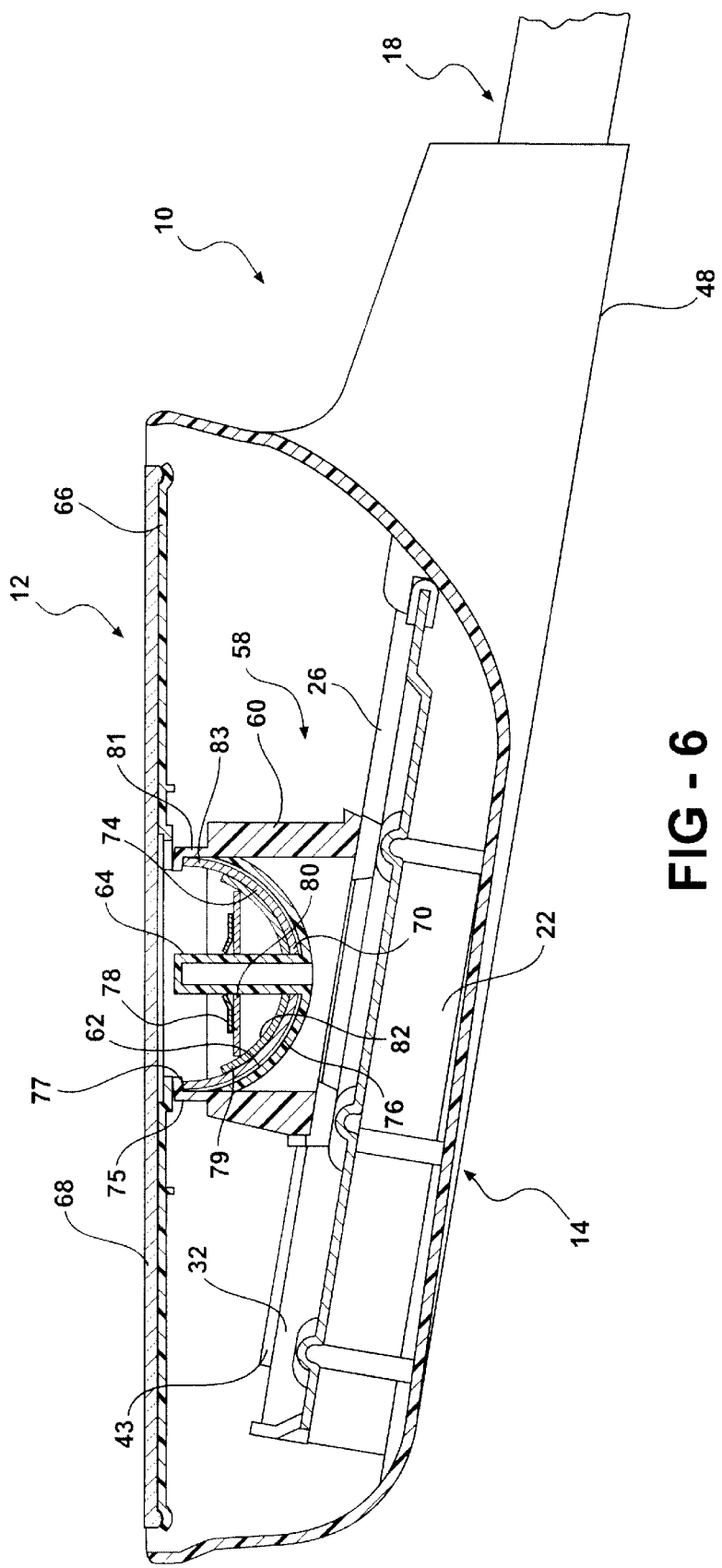
FIG. 6 is an enlarged fragmentary sectional view taken along line 6—6 of FIG. 1.

An integral clamp 26 is secured to the rear wall 28 of the housing 14 by a series of fasteners (not shown). The clamp 26 has a pair of generally parallel partial receiving portions 32 (FIGS. 2 and 6) which cooperate with a pair of generally parallel partial receiving portions defined by a set of three longitudinal ridges 34 (FIGS. 2 and 7) formed on the housing rear wall 28 to provide a pair of generally parallel mounting structure receiving portions. The ridges 34 extend nearly the entire length of the housing rear wall. Preferably, the clamp 26 is made of steel.

Figure 5:
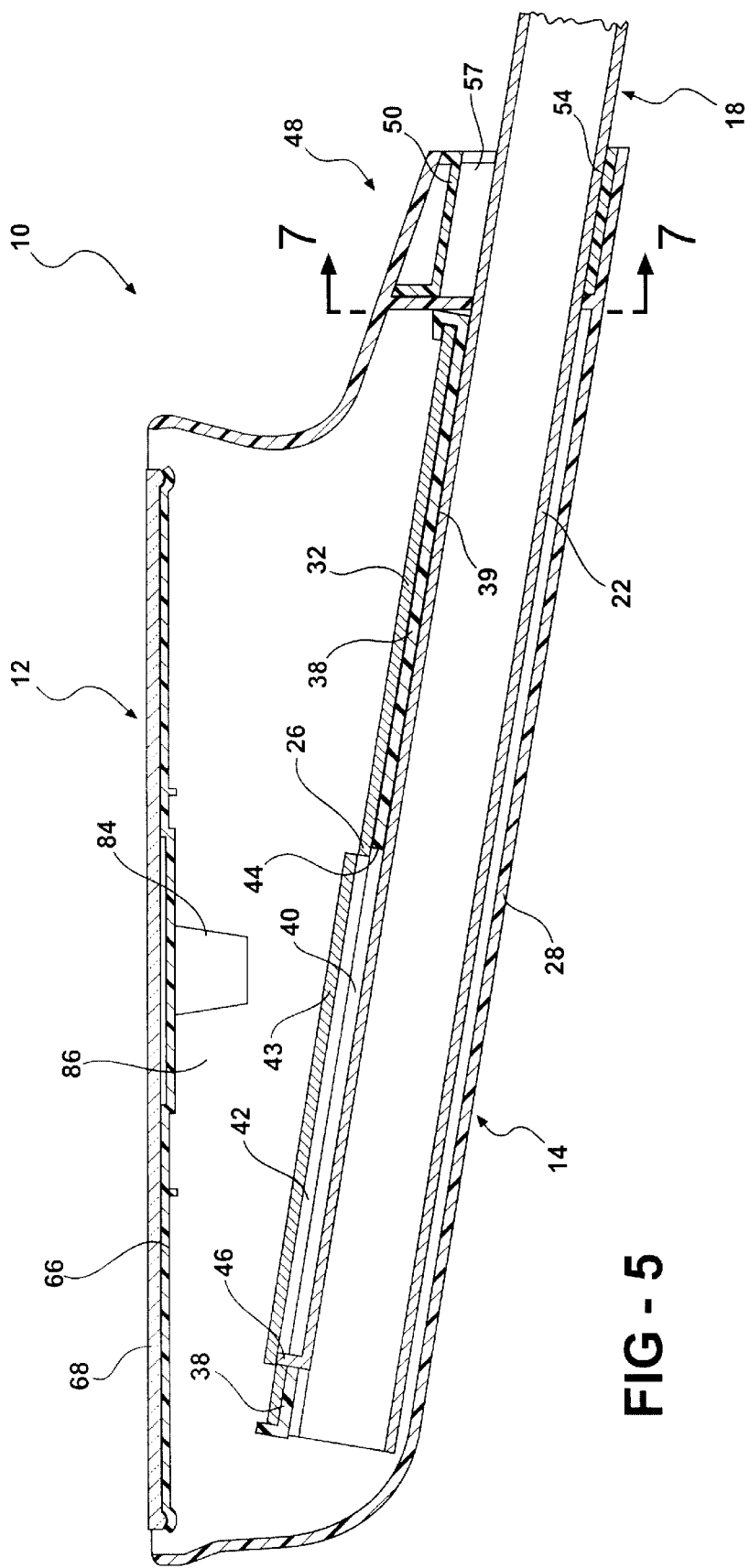
FIG. 5 is an enlarged fragmentary sectional view taken along line 5—5 of FIG. 1.

As best seen in FIG. 5, each of the partial receiving portions 32 of the clamp 26 has a plastic insert 38 with a concave mounting structure engaging surface 39 facing towards the rear wall 28 and ridges 34. One end of the insert 38 engages the clamp 26 while the other end snap-fits to a portion of the clamp 26 to thereby releaseably secure the insert in place. A narrow opening 40 extends longitudinally with respect to the insert 38. Adjacent the opening 40 the clamp 26 has longitudinal groove 42 accessible through the opening 40 and defined by raised portion 43. The groove 42 provides a stopping surface 44.

The housing 14 is slidably mounted to the legs 22 of the mounting structure 18 such that the engaging surfaces 39 of the inserts 38 engage the legs 22 against engaging surfaces of the ridges 34 in a tightly fit relation so that substantially no relative vibratory movements occur between the mounting structure 18 and the mirror housing 14 as a result of vehicle vibrations. This feature is particularly advantageous in preventing the reflective image from becoming distorted when the vehicle is subject to vibratory movements, such as when driving over potholes or other uneven terrain. Additionally, the-tightly fit relation between the engaging surfaces 39, the ridges 34, and the legs 22 is such that the mirror housing 14 can be repositioned laterally towards or away from the vehicle through an infinite range of positions and the mirror housing 14 will remain in selected on of the positions absent lateral force directed towards or away from the vehicle sufficient to overcome the tightly fit relation.

Each of the legs 22 has a projection 46 extending radially through the insert opening 40 and into the groove 42 on the clamp 26. As the mirror housing 14 is moved laterally away from the vehicle, the projection 46 engages the stopping surface 44 of the groove 42 to limit the lateral movement and prevent the housing 14 from being pulled off the mounting structure 18.

The housing 14 also has a pair of generally parallel tubular members 48 formed integrally therewith. A pair of plastic inserts 50 are inserted into the members 48 and are secured by resilient tabs 52 forming a snap-fit connection. The inserts 50 have interior leg engaging surfaces 54 defining generally cylindrical openings 56 formed therethrough. The openings 56 are sized with respect to the mounting structure legs 22 such that the interior leg engaging surfaces 54 engage the legs 22 in a tight fit relation in the same manner as the inserts 38 described above, thereby preventing vibratory movements and allowing for the infinite range of adjustments. It is to be understood that the tightly engaged relation may be provided by either insert 38 or 50 individually or by both as in the illustrated embodiment. Using both inserts 38, 50 to provide the tightly engaged relation is preferred because the more tight surface to surface contact between the mounting structure 18 and the housing 14, the less vibratory movement and the more secure the lateral position of the mirror housing 14. Also, the inserts 50 have rectangular openings 57 disposed above the cylindrical openings for allowing the leg projections 46 to pass through during mounting.

A manually adjustable mirror mounting assembly 58 is provided for mounting the mirror unit 12. The mirror mounting assembly 58 comprises a base member 60 secured to the clamp 26 by the same fasteners securing the clamp 26. The base member 60 has a substantially concave surface 62 facing forwardly and a shaft 64 extending from the center of the surface 62.

The mirror unit 12 comprises a mirror base 66 and a reflective mirror 68. The base 66 has a substantially circular central opening 70 and four substantially circular openings 71 spaced circumferentially around the central opening 70. The rear side of the base 66 has a substantially semi-spherical portion 74 providing a substantially convex surface 76 with the central opening 70 formed therethrough. The mirror base 66 with the mirror 68 thereon is engaged with the base member 60 such that the substantially concave surface 62 engages with the substantially convex surface 76 with the shaft 64 extending through the central opening 70. The base member 60 has a pair of resilient tabs 75 which snap-fit into openings 77 formed on the semi-spherical portion 74.

A semi-spherical liner 79 is disposed with the semi-spherical portion 74. A pair of washers 78, 80 fit over the shaft 64 and engage a forwardly facing concave surface 82 of the semi-spherical liner 79 to maintain engagement between the aforesaid concave and convex surfaces 62, 76. The mirror position can be adjusted about axes extending substantially perpendicular to the shaft 64 by manually tilting the mirror such that the convex surface 76 slides along the concave surface 62. The shaft 64 and the resilient tabs 81 limit the adjusting movements by engaging the inner edge of the central opening 70 and the edges of the openings 83, respectively. Additionally, a plurality of tabs 84 depending from the base 66 engage interior surfaces 86 of the housing 14 to prevent substantial rotational movement of the mirror base 66 and mirror 68 about the shaft 64.

The support structure 20 comprises a generally triangular base member 88 constructed and arranged to be fixedly secured to the exterior of a vehicle body. The base member has a housing structure 90 formed integrally therewith. The housing structure 90 defines a generally rectangular space 92 for receiving a resiliently yieldingly deformable engaging structure 93. Preferably, the deformable engaging structure 93 comprises a deformable engaging portion 94 in the form of a coil spring having a high spring constant; however, deformable solid materials, such as a high strength rubber or polymeric block, may be used instead. The engaging structure 93 also comprises a substantially non-deformable (preferably metallic) engaging portion 98 engaged with the deformable portion 94. A cover 100 molded from ASA fits over the base member 88 and is secured to the vehicle body to enhance vehicle aesthetics. The cover 100 has a housing covering portion 102 with an opening 104 providing access to the housing structure 90 and two concave arcuate surfaces 106 for receiving the cylindrical portion 24 of the mounting structure 18. Likewise, the housing structure 90 of the base member 88 has a pair of concave arcuate surfaces 108 for receiving the cylindrical portion 24.

The generally cylindrical portion 24 has a plastic sleeve 110 clasped thereto in surrounding relation. The sleeve 110 is formed of two clam-shell halves formed integrally together which are folded over the cylindrical portion 24. One side of the sleeve 110 defines an opening 112 which permits the engaging portion 98 to engage the cylindrical portion 24 directly. The other side of the sleeve 110 opposite the opening 112 has a projection 113 extending radially therefrom. A pair of generally L-shaped plastic covers 114, 116 are provided on each side of the sleeve 110 at the intersections of the legs 22 and the cylindrical portion 24. The L-shaped covers 114, 116 are each made from two molded ASA pieces which snap-fit together over the intersection to provide an enhanced aesthetic appearance relative to the weld marks formed when joining the legs 22 and cylindrical portion 24 together.

The cylindrical portion 24 also has a circumferential groove 109 formed thereon. A movement limiting structure 111 is fit onto the groove 109. The limiting structure 111 engages the sleeve 110 to prevent substantial movement of the cylindrical portion 24 and hence the mounting structure 18 in the vertical direction.

The mounting structure 18 is mounted to the support structure 20 by engaging the cylindrical portion 24 with the concave arcuate surfaces 108 on the housing structure 90 through the aforementioned sleeve opening 112 and securing the structure 18 thereto with bracket 118 and fasteners (not shown). The bracket 118 has a concave surface 120 engaging with the plastic sleeve 110 and an opening 121 formed through the surface 120 for receiving the radially extending projection 113. The projection 113 cooperates with the opening 121 to prevent rotational movement of the sleeve 110 when the mounting structure 18 pivots about its axis. Another cover portion 115 snap-fits onto the housing covering portion 102 to cover most of the cylindrical portion 24 from view.

The cylindrical portion 24 provides an engageable portion 124 in the form of a recessed surface facing generally radially with respect to the axis and the engaging portion 98 of structure 93 provides a raised surface 122. Although in the illustrated embodiment the recessed surface 124 is provided on the cylindrical portion 24 and the raised surface 122 is provided on the engaging structure 93, the location of the surfaces 122, 124 may be reversed. In fact, the raised surface 122 could be eliminated and the deformable structure 93 could be sized to be received in the recessed surface 124. The deformable portion 94 is positioned with respect to the engaging portion 98 to yieldingly maintain the surfaces 122, 124 in an engaged cooperating relationship so as to yieldingly maintain the mounting structure 18 and mirror housing 14 in a fixed angular position. The deformable structure 93 is configured such that application of a sufficient impact force to the mirror housing 14 pivots the mounting structure relative to the support structure so as to yieldingly deform the deformable portion 98 in a generally radial direction and disengage the cooperating surfaces 122, 124 from one another to thereby allow the mirror housing 14 to move pivotally in the direction of the impact force. It can be appreciated that during this pivotal movement, the sides of the recessed surface 124 cam the raised surface 122 inwardly so as to deform the portion 98, thereby allowing the raised surface 122 to engage the cylindrical surfaces of the cylindrical portion 24 adjacent the recessed surface 124. To return the mirror housing 14 to its fixed angular position, the housing 14 is pivoted opposite the direction of the impact force until the cooperating surfaces 122, 124 are aligned and the deformable portions 98 resiliently moves engaging portion 94 in opposite the generally radial direction into the aforesaid engaged cooperating relationship.

It is to be understood that the described embodiment is intended to illustrate the structural and functional principles of the present invention and is not intended to be limiting. To the contrary, the present invention is intended to encompass all modifications and alterations within the scope of the appended claims.

Any U.S. Patents and patent applications mentioned hereinabove and not specifically incorporated by reference are now hereby incorporated into the present application by reference.

What is claimed:

1. A rearview mirror assembly for installation on the side of a motor vehicle, said assembly comprising:

a support structure constructed and arranged to be fixedly mounted to the exterior side of the motor vehicle such that said assembly extends laterally outwardly with respect to the vehicle;

a mounting structure comprising a generally U-shaped member having a bight portion and a pair of leg portions defining generally spaced apart and parallel tubular members, said mounting structure mounted to said support structure for angular movement about a generally vertically extending axis with respect to the vehicle;

a mirror housing slidably mounted to said mounting structure and including a pair of openings for slidably receiving said tubular members therein;

a mirror mounted on a mirror base, said mirror base being mounted to said mirror housing, said mirror being selectively positioned and configured to reflect images of objects disposed rearwardly of said mirror assembly to a driver seated within the motor vehicle;

a clamp secured to said mirror housing and having a removable clamp-associated insert providing a mounting structure engaging surface for engaging said mounting structure in tightly fit relation so as to prevent relative vibratory movements between said mirror housing and said mounting structure such that (1) said mirror housing can be manually repositioned in a lateral direction towards or away from the vehicle through an infinite range of positions while said mirror faces rearwardly with respect to the vehicle by manually applying lateral force to said mirror housing directed towards or away from the vehicle sufficient to overcome said tightly fit relation without performing additional manual releasing operations and (2) said mirror housing will thereafter remain in a selected one of said positions absent application of lateral force to said mirror housing sufficient to overcome said tightly fit relation without performing additional manual securing operations;

said clamp being configured to restrict relative movement between said mirror housing and said mounting structure only to the aforesaid lateral direction;

said mounting structure engaging surface of said clamp engaging respective exterior surfaces of said leg portions to provide said tightly fit relation therebetween; and said mirror housing includes a longitudinal ridge, said clamp engaging said exterior surfaces of said leg portions so as to engage said exterior surfaces of said leg portion with said ridge provided by said mirror housing to provide said tightly fit relation.

2. A rearview mirror assembly according to claim 1, wherein said mirror housing is molded from plastic.

3. A rearview mirror assembly according to claim 2, wherein said tubular members are metal.

4. A rearview mirror assembly according to claim 1, wherein said removable clamp-associated insert is plastic.

5. A rearview mirror assembly according to claim 4, wherein said leg portions have projections extending radially therefrom and said clamp has projection receiving spaces providing stopping surfaces, said clamp being positioned such that said radially extending projections extend into said projection receiving spaces, said stopping surfaces being positioned and configured such that said projections will engage said stopping surfaces as said mirror housing is being moved laterally outwardly away from the vehicle to thereby prevent further lateral outward movement.

6. A rearview mirror assembly according to claim 5, wherein said mirror housing includes a rear wall providing a series of generally parallel and longitudinally extending ridges for engaging said leg portions.

7. A rearview mirror assembly according to claim 6, wherein a pair of removable opening-associated inserts are inserted into said openings, said opening-associated inserts providing said interior surfaces.

8. A rearview mirror assembly according to claim 7, wherein said removable opening-associated inserts form a snap-fit connection with said mirror housing.

9. A rearview mirror assembly according to claim 1, wherein said support structure comprises a resiliently yieldingly deformable mounting structure engaging structure;

said mounting surface having an engageable portion;

said deformable engaging structure being constructed and arranged to engage said engageable portion in a cooperating relationship so as to yieldingly maintain said mounting structure and said mirror housing in a fixed angular position with respect to said axis;

said deformable engaging structure being constructed and arranged such that application of a sufficient impact force to said mirror housing pivots said mounting structure relative to said support structure so as to yieldingly deform said engaging structure and disengage said engageable portion and said engaging structure from one another to thereby allow said mirror housing to move pivotally in the direction of said impact force;

said deformable engaging structure being configured such that said mirror housing can thereafter be returned to said fixed angular position by pivotally moving said mirror housing opposite the direction of the impact force until said engaging structure and said engageable portion are aligned and said deformable engaging structure resiliently returns to the engaged cooperating relationship.

10. A rearview mirror assembly according to claim 9, wherein said deformable engaging structure is a spring.

11. A rearview mirror assembly according to claim 10, wherein said engageable portion of said mounting structure comprises a recessed surface.

12. A rearview mirror assembly according to claim 11, wherein said recessed surface extends generally parallel to said generally vertically extending axis.

13. A rearview mirror assembly according to claim 12, wherein said mirror housing is molded from plastic.

14. A rearview mirror assembly according to claim 13, wherein said tubular members are metal.

15. A rearview mirror assembly according to claim 9, wherein said mounting structure comprises a generally cylindrical portion extending generally coaxial with said generally vertically extending axis, said generally cylindrical portion providing said engageable portion.

16. A rearview mirror assembly according to claim 15, wherein said engageable portion is a recessed surface.

17. A rearview mirror assembly according to claim 16, wherein said deformable engaging structure comprises a resiliently yieldingly deformable portion and substantially non-deformable engaging portion, said non-deformable portion being positioned and configured to engage said recessed surface on said generally cylindrical portion to thereby provide the engaged cooperating relationship.

18. A rearview mirror assembly according to claim 17, wherein said engaging portion comprises a raised surface positioned and configured to be received in said recessed surface to thereby provide the engaged cooperating relationship.

19. A rearview mirror assembly according to claim 18, wherein said deformable portion is a coil spring.

* * * * *

UNITED STATES PATENT AND TRADEMARK OFFICE
CERTIFICATE OF CORRECTION

PATENT NO. : 6,598,983 B1
DATED : July 29, 2003
INVENTOR(S) : Ian Boddy

It is certified that error appears in the above-identified patent and that said Letters Patent is hereby corrected as shown below:

Column 1,
Line 40, delete "of" between "fields" and "it".

Column 4,
Line 26, insert -- is -- between "18" and "preferably".
Line 38, delete "the" and insert -- a -- therefor to read "to a rear wall".

Column 5,
Line 7, insert -- a -- between "in" and "selected".
Line 7, delete "on" and insert -- one -- therefor.

Column 7,
Line 29, delete "moves" and insert -- move -- therefor.

Signed and Sealed this

Seventh Day of October, 2003

JAMES E. ROGAN
*Director of the United States Patent and Trademark Office*